Jan. 15, 1946. W. R. WILLIAMSON 2,392,893
EVAPORATOR
Filed Aug. 19, 1944 3 Sheets-Sheet 1

INVENTOR
WILLIAM R. WILLIAMSON
BY Chapin & Neal
ATTORNEYS

Jan. 15, 1946.   W. R. WILLIAMSON   2,392,893
EVAPORATOR
Filed Aug. 19, 1944   3 Sheets-Sheet 2

INVENTOR
WILLIAM R. WILLIAMSON
BY Chapin & Neal
ATTORNEYS

Jan. 15, 1946.  W. R. WILLIAMSON  2,392,893
EVAPORATOR
Filed Aug. 19, 1944  3 Sheets-Sheet 3

INVENTOR
WILLIAM R. WILLIAMSON
BY Chapin & Neal
ATTORNEYS

Patented Jan. 15, 1946

2,392,893

UNITED STATES PATENT OFFICE 2,392,893

EVAPORATOR

William R. Williamson, Hartford, Conn., assignor to The Maxim Silencer Company, Hartford, Conn., a corporation of Connecticut Application August 19, 1944, Serial No. 550,213

6 Claims. (Cl. 202—187)

This invention relates to evaporators, particularly such as are adapted for the production from sea water of a distillate having a regulable salt content, although capable of use for other purposes for which evaporating and distilling apparatus is customarily employed. One object of the invention is to produce an evaporator adaptable for use with the exhaust from an internal combustion engine as a source of heat. A further object is to control the water level in the vaporizing portion of the apparatus automatically in accordance with the amount of entrained water carried over in the distillate so that the amount of such entrained water, and hence the salt content of the distillate, may be held substantially constant at a desired level. A further object is to provide an evaporator particularly applicable to foamy liquids and to liquids tending to deposit scale or crystals on evaporation. A further object is to provide an evaporator capable of operation under varying conditions, such as with a variable heat supply from the exhaust gases or with liquids having different foaming properties. Additional objects will appear from the following description and claims.

Referring to the drawings.

Figure 1:
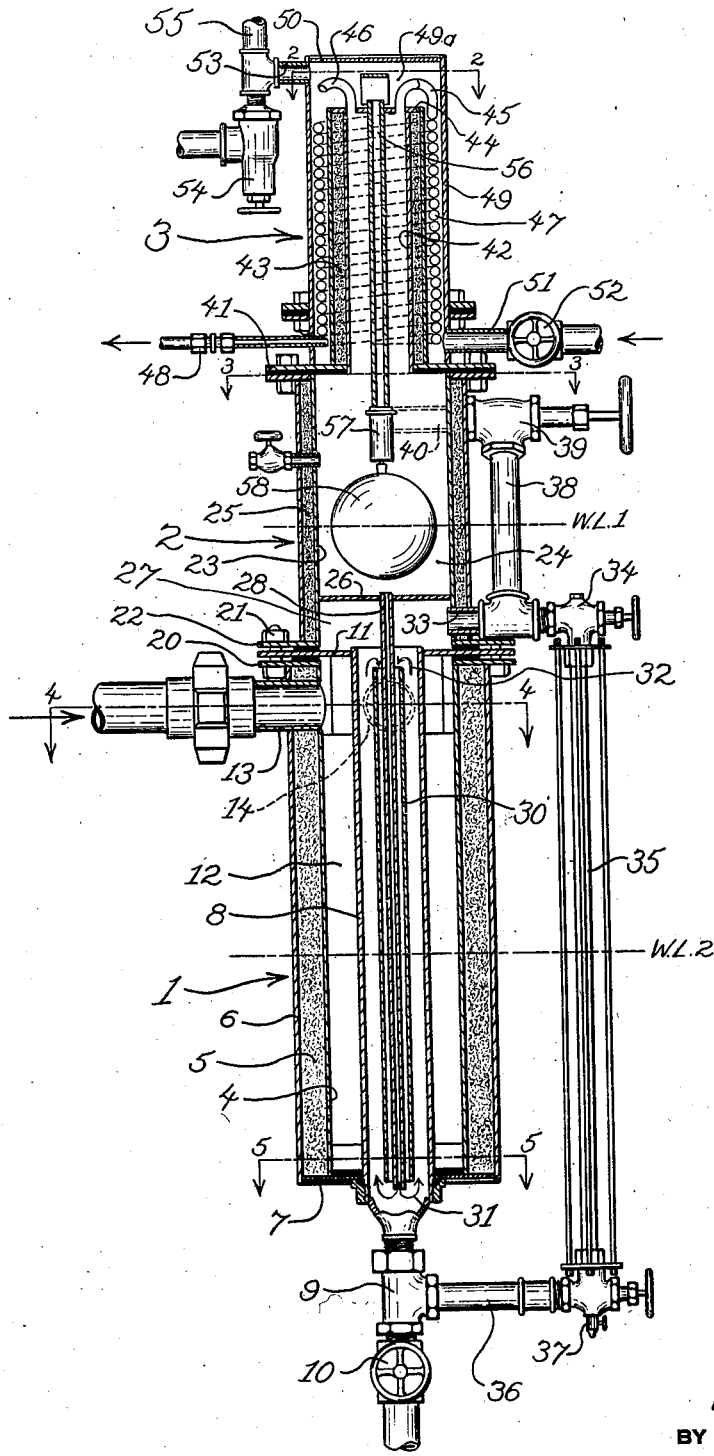
Fig. 1 is a median section through one form of evaporator constructed in accordance with the invention.

The evaporator is divided into a heating section 1, a separating and float control section 2, and a condensing section 3. The heating section is built within a shell 4 surrounded with a heat insulating lagging 5 of glass wool or the like surrounded by an outer retaining casing 6. The shell 4 and casing 6 are closed at the bottom by a plate 7 through which passes a tube 8 leading at its bottom into a T-connection 9 and a blow-off valve 10. At its upper end the tube 8 opens through a plate 11 which forms a closure for the top of the annular space 12 through which the exhaust gases, or other heating fluid such as steam, flows. An exhaust gas entrance pipe 13, which may be coupled to the exhaust pipe of an internal combustion engine, enters the top of the chamber 12 through casing 6 and shell 4, and an exit pipe 14 leaves the chamber in the same manner at a point about 90° from the entrance pipe.

Figure 6:
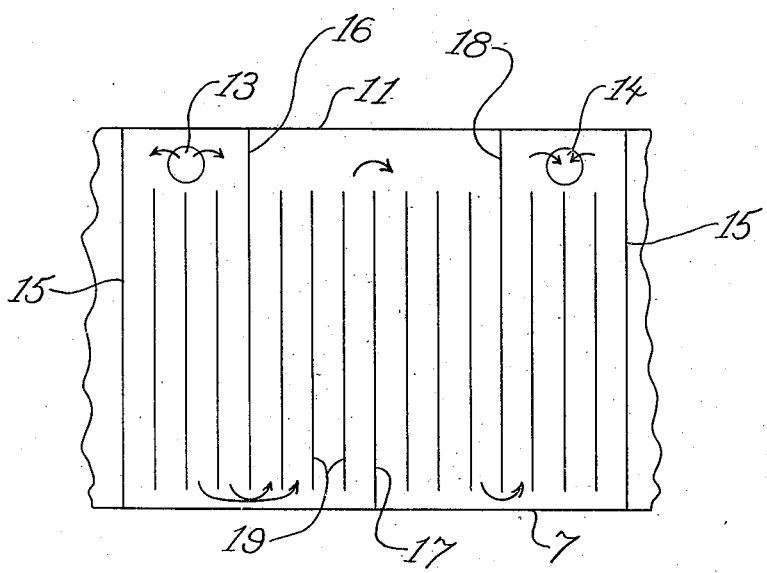
Fig. 6 is a diagrammatic representation of the path of the heating gases.

The exhaust gas is caused to pass any desired number of times, four as shown, along the length of the chamber 12 by a system of baffles extending between shell 4 and tube 8 and best illustrated in the diagrammatic showing of Fig. 6. A baffle 15 extends the full distance between plates 7 and 11 at a point intermediate the entrance and exit pipes to cut off direct communication between them. At points spaced 90° around the chamber a baffle 16 extends from the plate 11 and terminates short of plate 7, a baffle 17 extends from plate 7 and terminates short of plate 11, and a baffle 18 extends from plate 11 and terminates short of plate 7. The gas passes up and down the chamber in the manner shown by the arrows in Fig. 6. Intermediate these baffles are fins 19 which, as well as the aforementioned baffles, serve as extended heating surfaces to increase the transfer of heat to tube 8.

Figure 4:
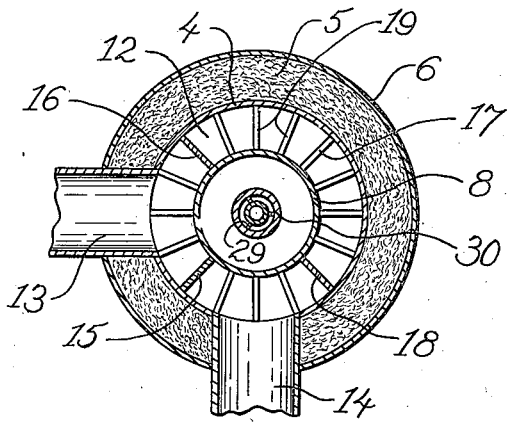
Fig. 4 is an enlarged section on line 4—4 of Fig. 1.
Figure 5:
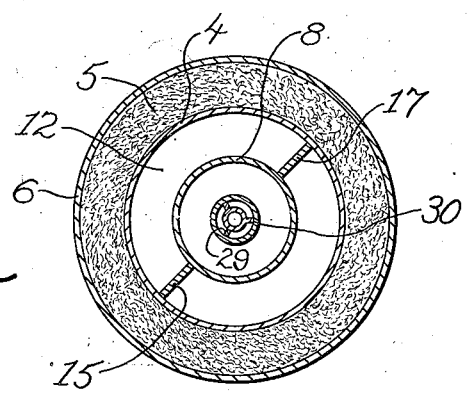
Fig. 5 is an enlarged section on line 5—5 of Fig. 1.

To a flange 20 on the top of shell 4 is clamped by bolts 21 the plate 11 and a flange 22 on the bottom of a shell 23 forming the wall of a separating and float control chamber 24. This is also preferably lagged at 25 with insulation surrounded by a suitable casing. Within the shell 23 is a plate 26 forming the bottom of chamber 24 and forming between it and plate 11 a chamber 27 which serves as a foam-breaking and preliminary separating chamber. A relatively small open-ended tube 28 extends downwardly, centrally of the above-mentioned tube 8, nearly to the bottom of the latter, and supports around it on fins 29 (Fig. 4) a pipe 30 open on both ends. The latter pipe, the space between which and tube 28 serves as a central annular downtake, preferably terminates at its upper end short of the upper end of the tube 8 and at its lower end short of the lower end of the tube 28. As will be described, water enters the heating space between tube 8 and pipe 30 through the tube 28 as shown by arrows 31 in Fig. 1, passes upwardly through this space, and then downwardly through the annular downtake for recirculation as shown by arrows 32. Steam, foam, and entrained water pass out through the top of tube 8 into the preliminary separating chamber 27.

Figure 2:
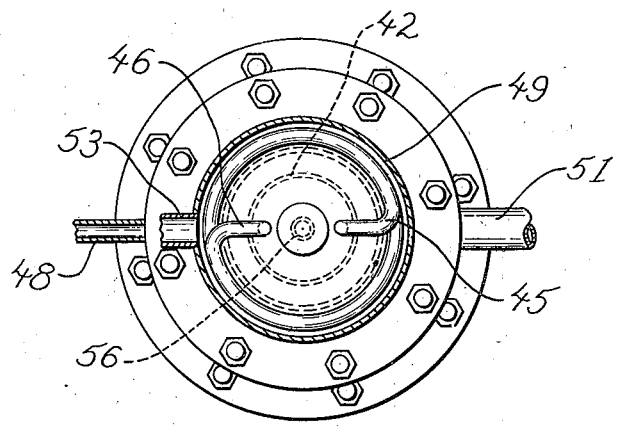
Fig. 2 is an enlarged section on line 2—2 of Fig. 1.
Figure 3:
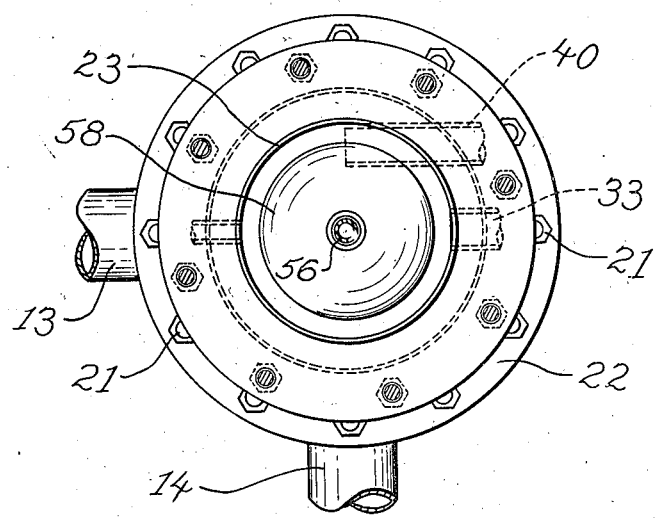
Fig. 3 is an enlarged section on line 3—3 of Fig. 1.

Much of the foam is broken, and entrained water separated, by striking against plate 26. The chamber 27 opens to a pipe 33 which leads through a regulable valve 34 to a water glass 35 which also serves as a return line to the heating chamber, being joined to the T-connection 9 by a pipe 36. A constantly open blow-off valve 37 is regulated as may be necessary to bleed from the system enough of the concentrate to prevent its concentration from rising to an undesirable degree. The straight path through pipe 33 to valve 34 takes a major part of the entrained water, a pipe 38 leaving pipe 33 upwardly at an abrupt angle to carry the steam. The pipe 38 joins, through a manually controlled throttle valve 39, a pipe 40 which enters the upper part of the chamber 24 tangentially (Fig. 2). Some of the entrained water will pass the entrance to pipe 38 by reason of its velocity and will thereby be separated from the steam, some will be separated in the pipe 38 itself and will run back, and the bulk of the remainder will be deposited on the walls of chamber 24 by the whirling motion given to the steam by its tangential entrance and will run down to the bottom of the chamber where it may under suitable conditions pass down tube 28 to go again through the cycle described.

Secured to the top of the separating chamber as by a flange connection 41 is a shell 42 lagged as at 43 and having its top closed by a plate 44. Through this plate open tubes 45 and 46 extending down the outside of the lagged shell 42 to form a double condenser spiral 47 and merging into a common outlet 48 for the distillate. The spiral is surrounded by a shell 49 having a top plate 50 which forms a chamber 49a for sea water entering through a pipe 51 provided with a suitable control valve 52. The water enters near the lower end of the condenser spiral and passes up along it so that, as is usual, the coolest water contacts the condenser at its discharge end. The major portion of the sea water is used only for cooling, being discharged through a pipe 53 having an adjustable relief valve 54 and preferably a combined pressure and temperature gauge connected at 55. A fraction of the sea water, for make-up purpose, passes downwardly through a central tube 56 which, at its lower end, is provided with a valve 57 controlled by a float 58.

As the steam, which has been largely separated from the water in chamber 24, passes upwardly through the interior of shell 42 it loses still more of its entrained water due to its relatively low velocity, and passes out through tubes 45 and 46 to the condenser spiral where it is condensed to water and delivered through outlet 48. The chamber 24 is thus at a pressure not very far from atmospheric depending on the discharge head of the distillate.

As a further explanation of the operation of the device, let us consider the train of events from a cold start. Before heat is supplied to the evaporator, the float valve 57 will permit the liquor to fill the system up to the level $WL_1$. As heat is supplied to the tube 8 through the tortuous gas passageways hereinbefore described, the liquor in the annular chamber formed between the concentric tubes 8 and 30 respectively becomes hot and commences to rise in pipe 38 due to its reduced density as compared with the cold liquor in chamber 24. The hot liquor passes upwardly into the chamber 27, thence through the nipple 33, the pipe 38, the open valve 39 and the tangentially disposed pipe 40 into the separator chamber 24. This can be considered as ordinary thermosiphon action and continues until the liquor reaches a steaming temperature, the initially present cold water in the chamber 24 having passed downwardly through the pipe 28.

Prior to reaching a steaming temperature, the pressure drop through the aforementioned upward path is low due to the low velocity therethrough but, as steaming starts, the volume of flow of hot water and a certain amount of entrained steam increases rapidly, resulting in an appreciable pressure drop through this path. This differential pressure results in the chamber 27 being at a correspondingly higher pressure than the chamber 24. Therefore some of the water in chamber 27 is forced through pipe 28 into chamber 24, the water level in the chamber 24 is raised somewhat above $WL_1$. This abnormally high water level in chamber 24 is soon reduced to $WL_1$ as evaporation progresses.

It is obvious that the difference in water levels in the chambers 24 and 27 is equal to the pressure drop through the aforementioned upward path, and therefore the level $WL_2$ in chamber 27 likewise continues to be reduced until the water in the chamber 24 reaches $WL_1$. Any tendency for the water level in chamber 24 to become lower than $WL_1$ permits the float 58 to open the valve 57 and so permit the entrance of make-up water from the chamber 49a and the pipe 56. The level $WL_1$ is thus automatically maintained once steaming is well under way. The valve 39 and its associated piping has now, of course, been cleared of water with its entrained steam, as previously mentioned, and is filled with steam accompanied by a certain amount of entrained water. The device is now in normal operation, with the water level in chamber 24 never varying appreciably from $WL_1$ and the water level in chamber 27 being at $WL_2$ where it may be readily seen in the water gauge 35. The actual water level $WL_2$ is determined by the setting of the valve 39. The automatic control is due to threefold action; firstly, the normal pressure drop due to steam passing through the valve 39; secondly, the pressure drop due to entrained water passing through said valve; and thirdly, the effect of changing steaming rate as heating surface is covered or uncovered by the changing water level $WL_2$.

The first of these effects has been discussed. The effect of entrained water is to further increase the pressure drop through the valve 39. This immediately results in a lowering of $WL_2$ with an attendant increase in separating efficiency, thus drying the steam both mechanically and thermally. This drying results in less pressure drop due to the second effect and the level is soon restored to $WL_2$. When $WL_2$ is lowered, less water is in contact with the heating surface of the tube 8 and therefore less steam is generated resulting in less pressure drop through the valve 39. The level $WL_2$ therefore rises on this account. All three of these effects conspire to maintain the level $WL_2$ in the heating section 1 at any desired point, depending on the degree of salinity required, upon the foaming properties of the liquid to be distilled, and upon the amount of heat supplied.

The saline content of the distillate is maintained at a substantially constant percentage determinable by the setting of valve 39. If this valve be relatively open, the pressure drop through it will not be high and a higher level of water in the heating chamber will be maintained. A high water level means that more entrained water will be carried in the steam, as there is less space for drying of the wet steam in the upper portion of the heating chamber and it is easier for foam and spray to reach the pipe 33. While this increase in entrained water will increase the pressure drop through valve 39, as was described above, this effect will not be as pronounced as with reduced openings of the valve. The result is a relatively rapid feeding of water through float valve 57, a high water level in the heating chamber, and a relatively high carry-over of entrained water through the condensing system. Since the saline content of the distillate comes only from the entrained water, this content will also be high. It will be seen that control of the salt content of the distillate may be controlled by valve 39 irrespective of the foaming characteristics of the liquid and of the amount of heat available from the exhaust connection 13. The quantity of distillate delivered will of course be varied by this control, but for most purposes for which this evaporator will be used the quality of the distillate is of more importance than its quantity.

Due to the circulation within and around pipe 8 a high rate of passage over the heating surfaces will result, whereby the deposition of scale is kept down, and the heat transfer rate is increased. As pointed out above, the degree of concentration of salt in the liquid may be kept down to the desired degree by regulating the setting of the continuously acting blow-off valve 37 or by periodic opening of valve 10.

I claim:

1. An evaporator comprising a boiler, a float chamber above the boiler for supplying water thereto, a float valve controlling the supply of water to the float chamber and operated by the water level in said chamber to maintain a minimum level therein, a constantly open connection between the bottom of the float chamber and the bottom of the boiler allowing passage of water in either direction, a connection from the top of the boiler having a tangential opening into the float chamber to convey steam and any entrained water from the boiler to the chamber, said connection being sufficiently restricted so that the presence of entrained water will cause a pressure drop between the boiler and the chamber tending to force water from the former to the latter, and a condenser receiving steam from the upper part of the float chamber.

2. An evaporator comprising a boiler, a constant level chamber above the boiler for supplying water thereto, a connection between the bottom of the constant level chamber and the bottom of the boiler allowing passage of water in either direction, a connection between the boiler and the constant level chamber to convey steam and any entrained water from the boiler to the chamber, said connection being sufficiently restricted to produce an increase in pressure drop between the boiler and the chamber as the content of entrained water in the steam passing through said chamber increases, and a condenser receiving steam from the constant level chamber.

3. An evaporator comprising a boiler, a constant level chamber above the boiler for supplying water thereto, a constantly open connection between the bottom of the constant level chamber and the bottom of the boiler allowing passage of water in either direction, a connection between the top of the boiler and the constant level chamber to convey steam and any entrained water from the boiler to the chamber, said connection entering the upper portion of the constant level chamber tangentially so as to precipitate entrained water therein, and being sufficiently restricted to produce an increase in pressure drop between the boiler and the chamber as the content of entrained water in the steam passing through said chamber increases, to cause passage of water through the constantly open connection to the constant level chamber from the boiler, and a condenser receiving steam from the constant level chamber.

4. An evaporator comprising a boiler, a constant level chamber above the boiler for supplying water thereto, a constantly open connection between the constant level chamber and the bottom of the boiler allowing passage of water in either direction, a connection for steam and any entrained water between the top of the boiler and the top of the constant level chamber, an adjustable valve in said connection whereby it may be restricted to produce a desired pressure drop between the boiler and the chamber and thus lower the water level in the boiler by upflow to the chamber as the entrained water content of the steam passing through said valve increases, and a condenser receiving steam from the constant level chamber.

5. An evaporator comprising a boiler, a constant level chamber above the boiler for supplying water thereto, a constantly open connection between the constant level chamber and the bottom of the boiler allowing passage of water in either direction, a connection for steam and any entrained water between the top of the boiler entering the upper portion of the constant level chamber tangentially so as to precipitate entrained water therein, an adjustable valve in said connection whereby it may be restricted to produce a desired pressure drop between the boiler and the chamber and thus lower the water level in the boiler by upflow to the chamber as the entrained water content of the steam passing through said valve increases, and a condenser receiving steam from the constant level chamber.

6. An evaporator comprising a boiler having a separating chamber at the top of its water-steam space, a water connection between the separating chamber and the lower part of the boiler, a constant level chamber above the separating chamber, a pipe connecting said chamber with the lower part of the boiler allowing passage of water in either direction, a connection for steam and any entrained water arising from said water connection and opening tangentially into the upper part of the constant level chamber, an adjustable throttle valve in said steam connection, and a condenser receiving steam from the constant level chamber.

WILLIAM R. WILLIAMSON.